United States Patent
Waz-Ambrozewicz et al.

(10) Patent No.: US 9,026,122 B2
(45) Date of Patent: May 5, 2015

(54) RELAY NODE OPERABLE WITH DIFFERENT SPATIAL CHARACTERISTIC ANTENNA PATTERNS

(75) Inventors: Andrzej Waz-Ambrozewicz, Wroclaw (PL); Maciej Pakulski, Czernica (PL)

(73) Assignee: Nokia Solutions and Networks Oy, Espoo (FI)

( * ) Notice: Subject to any disclaimer, the term of this patent is extended or adjusted under 35 U.S.C. 154(b) by 346 days.

(21) Appl. No.: 13/634,269

(22) PCT Filed: Mar. 12, 2010
(Under 37 CFR 1.47)

(86) PCT No.: PCT/EP2010/053224
§ 371 (c)(1),
(2), (4) Date: Dec. 6, 2012

(87) PCT Pub. No.: WO2011/110230
PCT Pub. Date: Sep. 15, 2011

(65) Prior Publication Data
US 2013/0109399 A1    May 2, 2013

(51) Int. Cl.
*H04W 72/04* (2009.01)
*H04W 88/04* (2009.01)
*H04B 7/155* (2006.01)
(Continued)

(52) U.S. Cl.
CPC ............ *H04W 72/048* (2013.01); *H04W 88/04* (2013.01); *H04B 7/0413* (2013.01); *H04B 7/024* (2013.01); *H04B 7/1555* (2013.01);
(Continued)

(58) Field of Classification Search
CPC ............... H04B 7/0413; H04B 7/2606; H04B 7/15592; H04B 7/024; H04B 7/0452; H04B 7/15528; H04B 7/022; H04B 7/0669; H04B 7/0617; H04B 7/15; H04B 7/15542; H04B 7/1555; H04B 7/15564; H04W 88/04; H04W 40/04; H04W 40/22; H04W 4/06; H04W 52/46
USPC .............. 455/13.1, 452.1, 436; 370/329, 330, 370/315, 331
See application file for complete search history.

(56) References Cited

U.S. PATENT DOCUMENTS 5,138,327 A * 8/1992 Chang et al. ................... 342/367
2002/0168973 A1 * 11/2002 Dent et al. ..................... 455/427
(Continued)

FOREIGN PATENT DOCUMENTS

| CN | 1297315 A | 5/2001 |
|---|---|---|
| CN | 101595660 A | 12/2009 |
| WO | WO 92/13398 | 8/1992 |

OTHER PUBLICATIONS

Husso, Mika, et al., "Adaptive Antennas and Dynamic spectrum Management for Femtocellular Networks: A Case Study", © 2008 IEEE, 5 pgs.

*Primary Examiner* — Nizar Sivji
(74) *Attorney, Agent, or Firm* — Harrington and Smith

(57) ABSTRACT

It is described a relay node for providing wireless access for a user equipment to a telecommunication network. The relay node includes an antenna, which is adapted to operate with different spatial characteristic antenna patterns, and a transceiver unit, which is coupled to the antenna and which is adapted to activate at least one of the different spatial characteristic antenna patterns. It is further described a corresponding method for providing wireless access for a user equipment to a telecommunication network via a relay node.

12 Claims, 1 Drawing Sheet

(51) Int. Cl.
*H04B 7/04* (2006.01)
*H04B 7/02* (2006.01)
*H04B 7/06* (2006.01)
*H04B 7/08* (2006.01)

(52) U.S. Cl.
CPC ............ *H04B 7/063* (2013.01); *H04B 7/0695* (2013.01); *H04B 7/088* (2013.01); *H04B 7/155* (2013.01)

(56) References Cited

U.S. PATENT DOCUMENTS

| | | | |
|---|---|---|---|
| 2007/0149117 A1* | 6/2007 | Hwang et al. | 455/11.1 |
| 2007/0225000 A1 | 9/2007 | Cleveland | 455/446 |
| 2009/0088071 A1 | 4/2009 | Rofougaran | 455/13.1 |
| 2009/0303891 A1* | 12/2009 | Lucas et al. | 370/252 |
| 2012/0196528 A1* | 8/2012 | Kazmi et al. | 455/9 |

* cited by examiner

RELAY NODE OPERABLE WITH DIFFERENT SPATIAL CHARACTERISTIC ANTENNA PATTERNS

FIELD OF INVENTION

The present invention generally relates to the field of mobile telecommunication networks. In particular, the present invention relates to a relay node for a mobile telecommunication network. Further, the present invention relates to method for providing wireless access for a user equipment to a telecommunication network via a relay node such as the above mentioned relay node.

ART BACKGROUND

A cost efficient solution for improving the performance and in particular the spatial coverage of Long Term Evolution (LTE) and LTE-Advanced (LTE-A) telecommunication networks is the utilization of relay nodes (RN), which allows installations without having terrestrial broadband access or the need to install micro wave links. In a relay enhanced telecommunication network there are basically three different types of radio connections:
A) A first type of radio connection is the connection between a base station (BS) and a user equipment (UE). This type of connection is called a direct link.
(B) A second type of radio connection is the connection between a BS and a RN. This type of connection is called a backhaul link or a relay link.
(C) A third type of radio connection is the connection between a RN and a UE. This type of connection is called an access link.

RNs are to become an intrinsic feature in particular for the LTE-Advanced technology and are currently undergoing a standardization process within 3GPP.

In a relay enhanced telecommunication network RNs have to serve two purposes: Firstly, they have to receive the radio transmissions from its serving BS, which is often also called donor BS. Secondly, they have to provide cellular coverage to UEs, which are located in those areas where the donor BS cannot provide sufficient service level. Those areas are for instance mobile service coverage holes such as indoor areas, which are due to building structures electromagnetically shielded from the donor BS. In order to achieve a high performance of a relay enhanced telecommunication network, the antenna characteristic, which is the spatial characteristic antenna pattern defining the radiation pattern of an antenna, has to be adapted to both above-described purposes. This means that one has to find a compromise between fulfilling these two purposes.

Typically, the first purpose, i.e. a good radio connection between the RN and the BS, is considered as to be much more important than the second purpose, i.e. good radio connection between the RN and US(s), because the backhaul/relay link has to carry data transmissions which are related to all UEs, which are currently connected to the RN. Further, the link between RN and BS will be used for backhaul traffic in the event of handover of a UE.

Specifically, an efficient improvement of indoor coverage requires that the radio link extending between the RN and its donor BS has a good or a very good quality, because this link will be used as backhaul for the RN, possibly to transfer huge amount of data both in the uplink (UL) and in the downlink (DL) direction.

If one considers cheap so called "all-in-one" box RNs, which have to be installed indoor, the need of providing a good quality for the radio link extending between the RN and its donor BS will cause that the RN has to be installed in the direct proximity of a window of the respective building. However, this may not be optimal from the indoor coverage point of view.

Generally speaking, known RNs do not ensure that the links to UEs can also have a high quality and this impacts the overall performance of the telecommunication network. A low quality link between a UE and a RN can lead to increase the retransmission of data or to a possible request for handover, both of which will consume radio resources and increase the amount of signaling. As a consequence, the performance of the telecommunication network decreases.

There may be a need for improving the performance of a relay enhanced telecommunication network.

SUMMARY OF THE INVENTION

This need may be met by the subject matter according to the independent claims. Advantageous embodiments of the present invention are described by the dependent claims.

According to a first aspect of the invention there is provided a relay node for providing wireless access for a user equipment to a telecommunication network. The provided relay node comprises (a) an antenna, which is adapted to operate with different spatial characteristic antenna patterns, and (b) a transceiver unit, which is coupled to the antenna and which is adapted to activate at least one of the different spatial characteristic antenna patterns.

The described Relay Node (RN) is based on the idea that by using variable pattern antennas the RN could be able to optimize both (a) the backhaul respectively the link, which extends between the RN and its serving BS, and (b) the access link, which extends between the RN and UE(s) served by the RN. Thereby, the coverage of an intended service area can be significantly increased.

By contrast to known RN(s) the antenna characteristic of the described RN can be optimized separately or independently for (a) the backhaul link and the relay link and (b) the access link(s).

It is mentioned that the described RN may specifically address the technology of Long Term Evolution (LTE) telecommunication networks. However, the described RN and methods in accordance with the invention described in this document can also be implemented elsewhere such as for instance in 3GPP UTRAN, wherever the Relay Node concept might apply. Further, the described RN methods described below can be used both for femto cells being served by a femto access point (FAP) and for macro cells being served by a macro or wide area (WA) BS.

In this respect it is mentioned that by contrast to a WA base station a FAP may be a much cheaper and less powerful device. This may hold in particular for the spatial coverage. A FAP may be designed for a maximal number of users respectively a maximal number of communication devices. Thereby, the maximal number may be typically between 5 and 20. By contrast thereto, a WA BS may be designed for serving much more users respectively communication devices. A WA base station may serve for instance 50, 100 or even more users respectively communication devices.

A further important difference between a FAP serving a femtocell and a WA BS serving an overlay or macro cell of a cellular telecommunication network can be seen in restricting the access of UEs respectively communication devices. A FAP typically provides access to a closed user group and/or to predefined communication devices only. This may be achieved by employing an appropriate rights management system, which can be implemented in the FAP. With such a rights management system it may be prevented for instance that an unauthorized user can use a private and/or a corporate owned printer, which represents a communication device being assigned to the femtocell of the home base station. By contrast thereto, a WA base station provides an unlimited access for UEs provided that the user of the respective UE has a general contract with the operator of the corresponding mobile telecommunication network or at least with an operator, which itself has a basic agreement with the operator of the WA base station.

In this document a UE may be any type of communication end device, which is capable of connecting with an arbitrary telecommunication network access point such as a BS, a RN and a FAP. Thereby, the connection may be established in particular via a wireless radio transmission link. In particular the UE may be a cellular mobile phone, a Personal Digital Assistant (PDA), a notebook computer, a desktop computer and/or any other a movable or a stationary communication device.

According to an embodiment of the invention the transceiver unit is adapted for controlling the different spatial characteristic antenna patterns in such a manner that (a) during a first time frame being used for radio communications between the relay node and its serving base station a first spatial characteristic antenna pattern is activated and (b) during a second time frame being used for radio communications (b1) between the relay node and at least one user equipment being served by the relay node and/or (b2) between the relay node and a further base station a second spatial characteristic antenna pattern is activated.

This may mean that the RN can adjust its antenna pattern so as to direct the main lobe into the direction of the strongest serving BS for the time frames being used for communication with the BS and optimize the antenna characteristics for the time frames being used for communication with the UEs. In other words, the described RN can adjust the antenna pattern so as to direct the main lobe into the direction of the strongest serving BS for the time frames used for communication with BS(s) and optimize the antenna characteristics for indoor propagation for the time frame used for communication with the UEs.

Generally speaking, by modifying the spatial characteristic antenna pattern, the RN can be able to select a proper donor BS that has a better signal to interference ratio (SIR) than another BS. If appropriate, the RN can perform a RN handover from a source donor BS to a target donor BS. Thereby, one can ensure that not only relay and backhaul links but also access links between RN and UE(s) have a good quality.

According to a further embodiment of the invention the transceiver unit comprises a learning system, which, after having been successfully trained, is adapted for selecting an appropriate spatial characteristic antenna pattern.

Thereby, in order to determine the best spatial characteristic antenna pattern, initially a learning phase takes place during which the various spatial characteristic antenna patterns are selected for a short time during which the RN maintains a normal communication with a UE and/or with its donor BS. From the different spatial characteristic antenna patterns the one resulting in the best quality of the signal of all the served UEs and/or the donor BS may be selected and stored in the RN. This can be done by using a memory which is associated with the transceiver unit. A control unit of the RN respectively of the transceiver unit will then search for a repetition of the spatial characteristic antenna pattern selected as optimal and attempt to find the rules allowing to select the particular pattern for instance for a given time and/or for a given user/requested service. Thereby, a correlation between time and/or user respectively requested service can be made. Once a re-occurrence of the selected spatial characteristic antenna pattern is detected, the learning phase may terminate. The corresponding results of the learning phase can be stored in a memory such as the above mentioned memory of the transceiver unit.

According to a further embodiment of the invention the relay node further comprises a sensor system for sensing the environment of the relay node, wherein the sensor system is adapted to provide the transceiver unit information which can be taken into account to activate an appropriate spatial characteristic antenna pattern.

By employing the described sensor system the RN will be able to scan the radio environment by modifying the characteristics of its antennas in the search for the maximum signal strength offered by a surrounding BS. The characteristics resulting in the highest received signal be selected and stored for further operational usage. Similarly, the RN will be able to scan the radio environment for UEs. In this way, the RN can adjust its antenna pattern so as (a) to direct the main lobe into the direction of the strongest serving base station and (b) to direct secondary or weaker lobe(s) toward those positions where UE(s) is/are currently situated.

According to a further embodiment of the invention the antenna comprises at least two antenna elements and the different spatial characteristic antenna patterns are achievable by varying a phase shift between the at least two antenna elements.

The phase shift can be applied both when the RN is transmitting a radio signal to a UE or the donor BS and when the RN is receiving a radio signal from a UE or from the donor BS. In the transmitting case the antenna characteristics are changed by varying the phase shift(s) between a transmitting part of the transceiver unit and different radiated antenna elements. In the receiving case varying phase shift(s) are introduced between the respective antenna elements and a receiving part of the transceiver unit.

According to a further embodiment of the invention the antenna elements are patch elements, which are arranged in an antenna array.

The antenna array comprising at least two radiating and/or receiving patch elements may be placed on the surface of a housing of the RN. Thereby, an antenna array with some predefined sets of spatial characteristic radiation patterns to choose from can be employed.

According to a further embodiment of the invention the antenna is a flat panel multi beam antenna. This may provide the advantage that the described RN can be realized simply by implementing the functionality that is needed to replace an omni-directional antenna of a known RN by the flat panel multi beam antenna and to provide the necessary functionality such as an appropriate electronic circuitry and logic in order to properly drive the flat panel multi beam antenna. Thereby, intelligent spatial shaping of the radiation pattern combined with frequency/scrambling code coordination between the RN and other access points will maximize the performance of the whole network and increase the overall performance which can be offered.

The use of a flat panel multi beam antenna may provide the advantage that the RN could be implemented by means of an all-in-one box RN wherein a flat panel adjustable antenna is integrated into to the housing of the RN. After powering up, such a device may scan the radio environment by means of shifting antenna characteristics in the search for the maximum signal strength offered by the most appropriate BS from all candidate BSs surrounding the RN.

The described scanning of the radio environment may be done in particular at an initial switch-on of the RN. Further, the described radio environment scanning may be done at periodic instances or when a certain power level falls below a certain threshold.

According to a further aspect of the invention there is provided a method for providing wireless access for a user equipment to a telecommunication network via a relay node, in particular via a relay node as described above. The provided method comprises activating at least one spatial characteristic antenna pattern of an antenna of a relay node, wherein the antenna is adapted to operate with different spatial characteristic antenna patterns.

Also the described method is based on the idea that by using variable pattern antennas the RN could be able to optimize both (a) the backhaul link respectively the relay link, which extend between the RN and its serving BS, and (b) the access link, which extends between the RN and UE(s) served by the RN. Thereby, the optimization can be accomplished separately (a) for the backhaul/relay link and (b) for the access link.

As has already been mentioned above the different spatial characteristic radiation patterns may apply both for transmitting and for receiving radio signals with the RN. In other words, with respect to UE(s) being served by the RN an appropriate spatial characteristic radiation pattern may be selected for Uplink (UL) signals from an UE to the RN and for Downlink (DL) signals from the RN to a UE. Correspondingly, with respect to a BS serving the above described RN an appropriate further spatial characteristic radiation pattern may be selected for UL signals from an RN to the BS and for DL signals from the BS to the RN. This may mean that if the spatial characteristic of a selected antenna pattern is optimized for transmitting radio signals to a specific location, the antenna will automatically provide for an enhanced sensitivity for receiving radio signals from a transmitting communication device being presently located at least approximately at that location.

According to an embodiment of the invention (a) during a first time frame of a radio resource partitioning scheme, which first time frame is used for radio communications between the relay node and its serving base station, a first spatial characteristic antenna pattern is activated and (b) during a second time frame of the radio resource partitioning scheme, which second time frame is used for radio communications (b1) between the relay node and at least one user equipment being served by the relay node and/or (b2) between the relay node and a further base station, a second spatial characteristic antenna pattern is activated. This may provide the advantage that the RN can adjust the antenna pattern so as to direct the main lobe into the direction of the strongest serving BS for those time frames being used for communication with BS(s) and optimize the antenna characteristics e.g. for indoor propagation during other time frames being used for communication with the UE(s) being served by the above described RN.

It is mentioned that by modifying the spatial characteristic antenna pattern, the RN can be able to select a proper donor BS that has a better signal to interference ratio (SIR) than another BS. Thereby, one can ensure that not only relay and backhaul links but also access links between RN and UE(s) have always an optimized quality.

According to a further embodiment of the invention the method further comprises (a) receiving by the relay node at least a first pilot signal being transmitted from a first base station and a second pilot signal being transmitted from a second base station, (b) measuring the strength of the received first pilot signal and the strength of the received second pilot signal, and (c) determining the base station, which is associated with the highest received pilot signal. Thereby, the at least one activated spatial characteristic antenna pattern provides for an optimization of the radio link between the determined base station and the relay node.

Generally speaking this may mean that the RN is capable of checking which of its surrounding BSs is most appropriate for serving as the donor BS. If the most appropriate donor BS is different from the current donor BS, the RN may trigger a RN handover from the current donor BS to a new target donor BS. Thereby, the spatial characteristic antenna pattern of the RN may be adapted such that an optimal radio connection between the RN and the new donor BS is achieved.

According to a further embodiment of the invention the method further comprises carrying out a learning phase, wherein for activating the at least one spatial characteristic antenna pattern results obtained by the learning phase are taken into account.

The learning phase may be accomplished by an initialization procedure, which can be triggered for instance after a first power up of the RN. Alternatively, the learning phase can be accomplished at regular time intervals and/or after a deterioration of the quality of a wireless connection between the RN and the donor BS and/or between the RN and a UE has been detected. Further, the learning phase can be accomplished at each power up of the RN.

According to a further embodiment of the invention carrying out the learning phase comprises (a) successively selecting the different spatial characteristic antenna patterns for radiating a radio signal by the relay node, (b) receiving the radio signal for each selected spatial characteristic antenna pattern by a receiving communication device, (c) measuring the level of each received radio signal, and (d) reporting to the relay node which spatial characteristic antenna pattern allows for the best radio link between the relay node and the receiving communication device.

The receiving communication device may be any network element, which is capable of receiving the radio signals which have been transmitted by the RN. In particular, the receiving communication device may be one or more user equipments and/or a BS such as the donor BS mentioned above.

Each spatial characteristic antenna pattern may be selected for a short time such as for instance a few milliseconds. During this short time period the RN may radiate a predetermined test signal. Preferably, this test signal will be radiated with a maximum radio transmission power.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
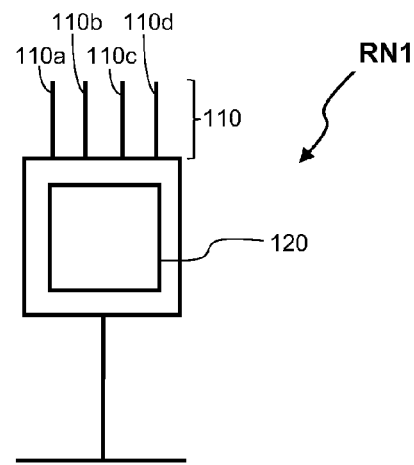
FIG. 1 shows a relay node comprising an antenna with four antenna elements and a transceiver unit, which is adapted to control the antenna elements in such a manner that the antenna comprises a predefined spatial characteristic antenna pattern.

The illustration in the drawing is schematically. It is noted that in different figures, similar or identical elements are provided with the same reference signs or with reference signs, which are different from the corresponding reference signs only within the first digit.

FIG. 1 schematically shows a relay node RN1 which is adapted to operate with different spatial characteristic antenna patterns. The relay node RN1 comprises an antenna 110 with four antenna elements 110a, 110b, 110c and 110d. The relay node RN1 further comprises a transceiver unit 120, which is adapted to control the antenna elements 110a-d in such a manner that the antenna 110 exhibits a predefined spatial characteristic antenna pattern. According to the embodiment described here the antenna 110 is a flat panel multi beam antenna. This allows the relay node RN1 to be implemented by means of an all-in-one box relay node wherein a flat panel adjustable antenna is integrated into to the housing of the relay node RN1.

Figure 2:
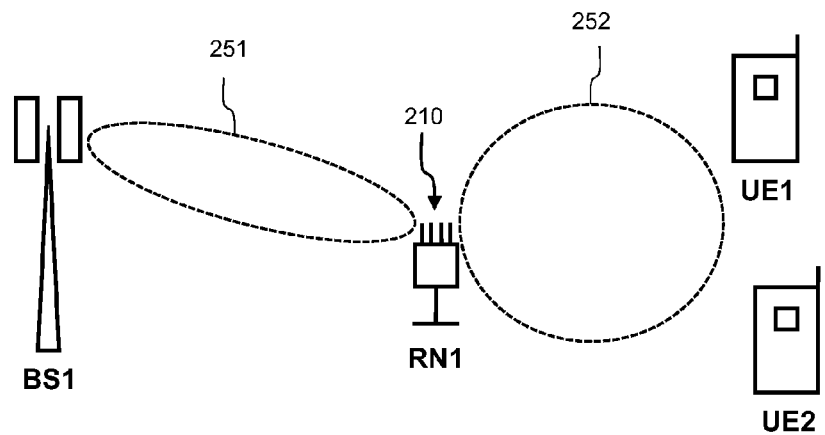
FIG. 2 illustrates a relay node with a variable antenna characteristic which is optimized for communication both with a donor base station and with a user equipment.

FIG. 2 illustrates the relay node RN1 in an operational state wherein the relay node RN1 is optimized for communication both with a donor base station BS1 and with two user equipments UE1 and UE2. Thereby, a transceiver unit controls an antenna 120 of the relay node RN1 in such a manner that during a first time slot a first spatial characteristic antenna pattern 251 is activated, which is optimized for a radio communication with the base station BS1. Further, during a second time slot a second spatial characteristic antenna pattern 252 is activated, which is optimized for a radio communication with the user equipments UE1 and UE2.

According to the embodiment described here the different spatial characteristic antenna patterns 251 and 252 are achieved by introducing different phase shifts between the transceiver unit (not depicted in FIG. 2) at the one hand and the various antenna elements on the other hand. As has already been mentioned above in the Summary of the Invention the different phase shifts can be applied both (a) when the relay node RN1 is transmitting a radio signal to a user equipment UE1 and/or UE2 or to the donor base station BS1 and (b) when the relay node RN1 is receiving a radio signal from a user equipment UE1 and/or UE2 or from the donor base station BS1. In the transmitting case the antenna characteristics are changed by varying the phase shift(s) between a transmitting part of the transceiver unit and different radiated antenna elements. In the receiving case varying phase shift(s) are introduced between the respective antenna elements and the receiving part of the transceiver unit.

Figure 3:
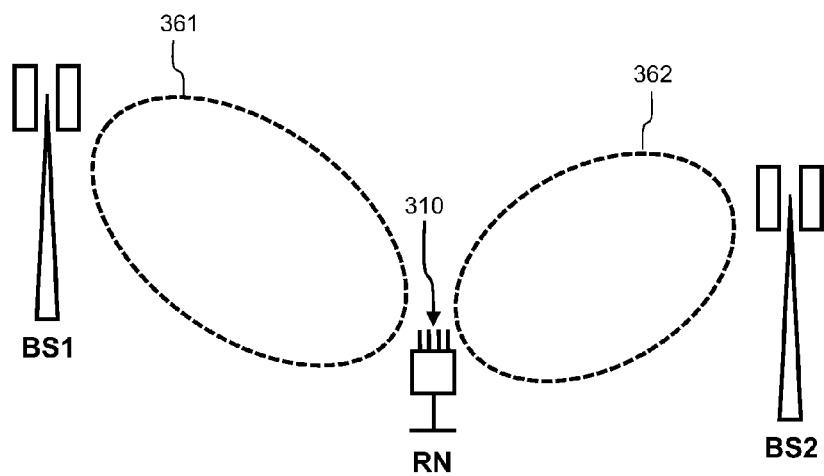
FIG. 3 illustrates a relay node with a variable antenna characteristic for communication with one of two base stations, which offers the best signal or service quality for the relay node.

FIG. 3 illustrates a relay node RN1 with a variable spatial antenna characteristic for communication with one of two base stations BS1 and BS2. After having checked the radio channel quality of the respective radio links the relay node RN1 can decide to connect with this base station BS1 or BS2, which offers the best signal or service quality for the relay node RN1. Such a decision of the relay node RN1 may be used in connection with a handover of the relay node RN1 from one base station BS1 or BS2 to the other base station BS2 or BS1.

In accordance with the scenario illustrated in FIG. 2, for communication with the base station BS1 (a) during a first time slot a first spatial characteristic antenna pattern 361 of the antenna 310 is activated and (b) during a second time slot a second spatial characteristic antenna pattern 362 of the antenna 310 is activated. Thereby, the first spatial characteristic antenna pattern 361 is optimized for a radio communication with the base station BS1 and the second spatial characteristic antenna pattern 362 is optimized for a radio communication with the base station BS2.

The spatial characteristic antenna pattern resulting in the highest received signal may be selected and stored for further operational usage. For deciding which base station is the strongest it might be advantageous not to take into account home base stations or home eNBs that could potentially also be detected by the relay node RN1 in the course of an appropriate radio environment scanning procedure. In this respect it is mentioned that home base stations or home eNBs (HeNBs) could be distinguished from macro base stations or macro home eNBs by their ID (e.g. HeNB ID), which is usually broadcasted in system broadcast messages. A similar procedure can be used to detect the radio environment settings optimal for communication with the user equipments. However, scanning the radio environment with respect to user equipments should be triggered more frequently as UEs can roam throughout the areas served by the relay node RN1. In case the relay node is used for serving an indoor area the user equipments may roam through the respective building.

It is mentioned that the described radio environment scanning can also be used by outdoor relay nodes. This might be in particular beneficial on cell edges, where the coverage from more than one macro base station might be received on similar signal levels. The relay node may change its antenna characteristics to connect to the base station which offers the best Signal-to-Interference Ration (SIR) and/or towards the base station which is currently less loaded with radio data transmission to and/or from other radio network elements. This may be triggered by Self Optimizing Network (SON) functionality of the telecommunication network.

It is mentioned that the relay node and the method for providing wireless access for a user equipment to a telecommunication network via a relay node described in this document may be preferably applicable for the independent relay nodes (i.e. "type 1 relay nodes") that have their own cell identity, which is separate from their serving donor base station.

However, the concept described in this document could also be adapted for those relay nodes that do not manage their own cell independently (i.e. "type 2 relay nodes"). A type 2 relay node will have to communicate with its predefined donor base station because these two needs to align the Radio Resource Control (RRC) procedures (the relay node can manage some part of the RRC or the donor base station can have a complete control of the RRC). Thereby, the control plane communication between a type 2 relay node and its serving donor base station does not require a huge data transfer capacity, and can be decoupled from transmitting actual bulk of user data over the backhaul link. Therefore the control data can be sent to the donor base station all the time, while the destination base station for the backhaul data could be selected on a case-by-case basis, depending on the radio conditions and, resulting from it, the current set-up of the antenna at the relay node. It is mentioned that another possibility would be to send all the backhaul (i.e. data and control) data to an opportunistic base station that then forwards all the backhaul data to the donor base station over an X2 link, which connects the opportunistic best base station and the donor base station in a wireless manner.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 110 antenna
110a-d antenna element
120 transceiver unit
210 antenna
251 first spatial characteristic antenna pattern
252 second spatial characteristic antenna pattern
310 antenna
361 first spatial characteristic antenna pattern
362 second spatial characteristic antenna pattern
RN1 relay node
BS1 base station/eNodeB
BS2 base station/eNodeB
UE1 user equipment
UE2 user equipment

The invention claimed is:

1. A relay node for providing wireless access for a at least one user equipment to a telecommunication network, the relay node comprising:
an antenna, that is adapted to operate with different spatial characteristic antenna patterns; and
a transceiver unit, that is coupled to the antenna and is adapted to activate at least one of the different spatial characteristic antenna patterns,
wherein the antenna comprises at least two antenna elements and the different spatial characteristic antenna patterns are achieved by varying a phase shift between the at least two antenna elements, and
wherein the phase shift is varied when the relay node is transmitting a radio signal to at least one of a base station and the at least one user equipment and when the relay node is receiving a radio signal from at least one of the base station and the at least one user equipment, and
wherein the transceiver unit is adapted for controlling the different spatial characteristic antenna patterns, wherein during a first time frame that is used for radio communications between the relay node and its serving base station a first spatial characteristic antenna pattern is activated and
during a second time frame that is used for radio communications between the relay node and the at least one user equipment served by the relay node and/or between the relay node and a another base station a second spatial characteristic antenna pattern is activated.

2. The relay node as set forth in claim 1, wherein the transceiver unit comprises a learning system, wherein, after having been successfully trained, is adapted for selecting an appropriate spatial characteristic antenna pattern.

3. The relay node as set forth in claim 1, further comprising a sensor system for sensing an environment of the relay node, wherein the sensor system is adapted to provide the transceiver unit information that is taken into account to activate an appropriate spatial characteristic antenna pattern.

4. The relay node as set forth in claim 1, wherein the at least two antenna elements are patch elements, that are arranged in an antenna array.

5. The relay node as set forth in claim 1, wherein the antenna is a flat panel multi beam antenna.

6. A method comprising:
providing wireless access for a at least one user equipment to a telecommunication network via a relay node, comprising:
activating at least one spatial characteristic antenna pattern of an antenna of a relay node, wherein the antenna is adapted to operate with different spatial characteristic antenna patterns,
wherein the antenna comprises at least two antenna elements and the different spatial characteristic antenna patterns are achieved by varying a phase shift between the at least two antenna elements, and
wherein the phase shift is varied when the relay node is transmitting a radio signal to at least one of a base station and the at least one user equipment and when the relay node is receiving a radio signal from at least one of the base station and the at least one user equipment, and
wherein
during a first time frame of a radio resource partitioning scheme, the first time frame is used for radio communications between the relay node and its serving base station, a first spatial characteristic antenna pattern is activated and
during a second time frame of the radio resource partitioning scheme, the second time frame is used for radio communications between the relay node and the at least one user equipment that is served by the relay node and/or between the relay node and a another base station, a second spatial characteristic antenna pattern is activated.

7. The method as set forth in claim 6, further comprising
receiving by the relay node at least a first pilot signal that is transmitted from the base station and a second pilot signal being transmitted from the another base station,
measuring the strength of the received first pilot signal and the strength of the received second pilot signal, and
determining a base station from among the base stations, that are associated with a highest received pilot signal,
wherein the at least one activated spatial characteristic antenna pattern provides for an optimization of a radio link between the determined base station and the relay node.

8. The method as set forth in claim 6, further comprising carrying out a learning phase,
wherein for activating the at least one spatial characteristic antenna pattern results obtained by the learning phase are taken into account.

9. The method as set forth in claim 8, wherein carrying out the learning phase comprises
successively selecting different spatial characteristic antenna patterns for radiating a radio signal by the relay node,
receiving a radio signal for each selected spatial characteristic antenna pattern by a receiving communication device, and measuring the level of each received radio signal, and reporting to the relay node a determined spatial characteristic antenna pattern that allows for a optimal radio link between the relay node and the receiving communication device.

10. An apparatus comprising:

a processor; and a memory including computer program code, where the memory and the computer program code are configured, with the processor, to cause the apparatus to at least:

provide, with a relay node, wireless access for a at least one user equipment to a telecommunication network, the relay node comprising an antenna, that is adapted to operate with different spatial characteristic antenna patterns; and activate at least one of the different spatial characteristic antenna patterns, wherein the antenna comprises at least two antenna elements and the different spatial characteristic antenna patterns are achieved by varying a phase shift between the at least two antenna elements, and wherein the phase shift is varied when the relay node is transmitting a radio signal to at least one of a base station and the at least one user equipment and when the relay node is receiving a radio signal from at least one of the base station and the at least one user equipment, and control the different spatial characteristic antenna patterns, wherein during a first time frame that is used for radio communications between the relay node and its serving base station a first spatial characteristic antenna pattern is activated and during a second time frame that is used for radio communications between the relay node and the at least one user equipment served by the relay node and/or between the relay node and a another base station a second spatial characteristic antenna pattern is activated.

11. The apparatus as set forth in claim 10, wherein the apparatus comprises a learning system, wherein, after having been successfully trained, is at Isadapted for selecting an appropriate spatial characteristic antenna pattern.

12. The apparatus as set forth in claim 10, wherein the memory including the computer program code is configured with the processor to cause the apparatus to sense an environment of the relay node, wherein the sensor system is adapted to provide the apparatus information that is taken into account to activate an appropriate spatial characteristic antenna pattern.

* * * * *